United States Patent [19]

Yoneda et al.

[11] Patent Number: 5,010,472

[45] Date of Patent: Apr. 23, 1991

[54] CUSTOMER PARTICIPATORY ELEVATOR CONTROL SYSTEM

[75] Inventors: Kenzi Yoneda; Takaaki Ueshima; Soshiro Kuzunuki, all of Katsuta; Yuzo Morita, Hitachi; Toshimitsu Tobita, Katsuta, all of Japan

[73] Assignee: Hitachi, Ltd., Tokyo, Japan

[21] Appl. No.: 311,952

[22] Filed: Feb. 17, 1989

[30] Foreign Application Priority Data

Mar. 4, 1988 [JP] Japan .................................. 63-49536

[51] Int. Cl.[5] ...................... G05B 13/02; G05B 17/42; G09C 15/00; B66B 3/00

[52] U.S. Cl. .................................. 364/148; 364/513; 364/192; 187/130

[58] Field of Search ............... 364/148, 513, 191, 192; 187/100, 121, 124, 127, 128, 139, 133, 130, 129

[56] References Cited

U.S. PATENT DOCUMENTS

| | | | |
|---|---|---|---|
| 4,697,243 | 9/1987 | Moore et al. | 364/184 |
| 4,700,810 | 10/1987 | Otala | 187/130 |
| 4,719,993 | 1/1988 | Ujihara | 187/101 |
| 4,724,931 | 2/1988 | Ichioka | 187/101 |
| 4,754,851 | 7/1988 | Suzuki | 187/129 |
| 4,760,896 | 8/1988 | Yamaguchi | 187/124 |
| 4,771,865 | 9/1988 | Hinderling | 187/130 |
| 4,844,204 | 7/1989 | Oraska et al. | 187/101 |
| 4,860,207 | 8/1989 | Kubo | 187/124 |

FOREIGN PATENT DOCUMENTS

| | | |
|---|---|---|
| 56-37145 | 8/1981 | Japan . |
| 58-119567 | 7/1983 | Japan . |
| 59-31266 | 2/1984 | Japan . |
| 59-48364 | 3/1984 | Japan . |
| 2025663 | 7/1979 | United Kingdom . |
| 2136158 | 2/1983 | United Kingdom . |
| 2128369 | 8/1983 | United Kingdom . |

*Primary Examiner*—Jerry Smith
*Assistant Examiner*—Jim Trammell
*Attorney, Agent, or Firm*—Antonelli, Terry, Stout & Kraus

[57] ABSTRACT

A customer participatory elevator control system includes a device for setting and storing information necessary to operate a plurality of elevators on trial and a device for operating the elevators on the basis of the trial operation information. When the customer inputs into the control system a request which is unexpected to the elevator maker in the course of design of operation specifications, the control system enables the customer to carry out a trial of elevator call assignment control and guide control in accordance with the customer's request and changes the designed elevator operation specifications in accordance with results of the trial.

7 Claims, 18 Drawing Sheets

FIG. 9A iT11

| RULE \ CALL | 1U | 2U | 3U | 4U | 5U | 2D | 3D | 4D | 5D | 6D | 6DB |
|---|---|---|---|---|---|---|---|---|---|---|---|
| RULE 1 | | | ○ | | | | | | | ○ | ○ |
| RULE 2 | | | | | | | ○ | | | | ○ |
| RULE 3 | ○ | | ○ | | | | | | | ○ | ○ |

FIG. 9B iT12

| RULE \ CONDITION | DAY DESIGNATION DAY | TIME TIME | WEIGHT WEIGHT | WAITING TIME WAITT | WAITING PASSENGER NUMBER NUMBER | DESIGNATED MACHINE NUMBER KFIT | TRAFFIC TRAFIC |
|---|---|---|---|---|---|---|---|
| UNIT | 0-6 bit | HOUR: MINUTE | % | second | PASSENGERS | 0-7 bit | PASSENGERS /5MINUTES. ELEVATOR |
| RULE 1 | | | WEIGHT × 0.3 | | | | |
| RULE 2 | | 1000 < TIME 22:00 < | | | | | TRAFIC < 25 |
| RULE 3 | | | | WAITT =< 30 | | | TRAFIC > 10 |

FIG. 9C iT13

| RULE | CONDITIONAL FORMULA & EXECUTION FORMULE |
|---|---|
| (PG21) | W = WEIGHT(K) − SEKISAI(K) * 0.3<br>IF W>O THEN VALUE(CK) = (1.5) * W * MT / SEKISAI(CK) WAITT<br>ELSE VALUE(K) = WAITT<br>A SIGN = K FOR MIN I VALUE(K) |
| (PG22) | A SIGN = 3 |
| (PG23) | IF WAITT(K) < (TRAFIC−10) × 0.8<br>THEN VALUE(K) = MAX<br>A SIGN = K FOR MIN I VALUE(K) |

FIG. 10A iT21

| RULE \ CALL | 1U | 2U | 3U | 4U | 5U | 2D | 3D | 4D | 5D | 6D |
|---|---|---|---|---|---|---|---|---|---|---|
| RULE 1 | ○ | | | | | | | | | |
| RULE 2 | ○ | ○ | ○ | ○ | ○ | | | | | |
| RULE 3 | | | | | | ○ | ○ | ○ | ○ | ○ |

FIG. 10B iT22

| RULE \ CONDITION | DAY DESIGNATION DAY | TIME TIME | WEIGHT WEIGHT | WAITING TIME WAITT | WAITING PASSENGER NUMBER NUMBER | DESIGNATED MACHINE NUMBER KFIT | TRAFFIC TRAFIC |
|---|---|---|---|---|---|---|---|
| UNIT | | HOUR : MINUTE | | second | i | 0-7 bit | PASSENGERS |
| RULE 1 | — | 08:00 < TIME <09:00 | — | < 30 | > 20 | | TRAFIC > 10 |
| RULE 2 | — | — | < 80 | < 45 | — | STOPPING OR EXPECTED STOPPING ELEVATOR | TRAFIC >= 5 |
| RULE 3 | TUESDAY, THURSDAY | 10:00 16:00 | — | WAITT => 15 | | ditto | TRAFIC >= 5 |

FIG. 10C iT23

| DISPLAY FOR FORM EXECUTION PART / RULE | WAITING TIME DISPLAY | ARRIVAL SEQUENCE DISPLAY | RESERVED ELEVATOR DISPLAY | ARRIVAL DISPLAY | ELEVATOR POSITION DISPLAY | ELEVATOR SERVICE INVALID FLOOR DISPLAY | GENERAL INFORMATION DISPLAY | |
|---|---|---|---|---|---|---|---|---|
| RULE 1 | | ○ | | | | | | |
| RULE 2 | ○ | | | | ○ | ○ | | |
| RULE 3 | | | | | | | ○ | GOODS EXHIBITION IS HELD ON THE LOBBY |
| RULE 4 (FUNDAMENTAL CONTROL) | | | ○ | ○ | | | | |

CUSTOMER PARTICIPATORY ELEVATOR CONTROL SYSTEM

BACKGROUND OF THE INVENTION

This invention relates to elevator control systems and more particularly to a customer participatory elevator control system which can change operation control and guide control to carry out operation control specifications on a trial basis and enable the user to participate in decision making in selection.

Conventionally, in the manufacture of the elevator control system, the elevator maker holds a conference with the customer to determine specifications of elevator operation control, hall call assignment control, guide control and information presentation control and the thus determined specifications are preset through programming or a like procedure.

However, after the elevator control system is delivered and installed for service, various kinds of requests of the customer are liable to take place.

For example, the request of the customer includes:

① a request for changing the operation management form whereby the reference floor is desired to be changed from the first floor to the first basement;

② a request for changing the call assignment control whereby the full-up cage nonstop control, in which a cage loaded with 80% or more of the rated loading weight is regularly decided to be a full-up cage and inhibited from serving for halls, is changed such that in respect of an elevator which is 50% to 80% loaded or in which the degree of jam measured by an ITV sensor in terms of an area of cage floor occupied by passengers is 60% to 90%, nonstop is permitted as far as possible or control for suppressing assignment is added;

③ a request for changing the guide control whereby a predictive arrival time digitally displayed on a panel indicator is changed to an analog guide display; and ④ a request for changing the information presentation control whereby a recently proposed scheme of display, in which a display panel indicator is used to display a predictive arrival time when the elevator service guide is in use and to display general living information such as a weather forecast and commercial information such as a diagram at a nearby station when the elevator service guide is not in use, is changed such that when the waiting time at the hall is long (during the occurrence of a longtime waiting), only the information which would be desired by the user (the above general living information and the like information) is displayed by taking into account a predictive elevator arrival time on the basis of the time zone, the degree of jam and service direction even in the event that the elevator service guide is in use.

In the past, the above request for changing the fundamental specifications is dealt with by designing a new program, testing the new program repetitively in a system equivalent to the delivered and installed elevator system and thereafter exchanging the old program with the new program. This procedure requires much labor and a high cost.

Under the circumstances, the applicant of the present application has proposed in JP-A-58-119567 a system for control of individual elevators which comprises an operation controller including an operation mode selection circuit and an operation command specification unit for setting specifications in accordance with the mode of operation, so that various structures of elevator control logic can be realized in the form of programs of high visibility which are well arranged. This proposal succeeds in facilitating the attending of the change of operation specifications after delivery but faces a problem such that the customer or maintenance engineer per se is not allowed to participate in correcting the elevator operation specifications.

Also, Japanese Patent Publication No. 56-37145 proposes a system for efficiently examining which method is the most excellent as hall call assignment algorithm. In this proposal, the elevator utilization condition and the like are transmitted to a simulator through a telephone line and thereafter movement of the elevator pursuant to simulation results is visually displayed, thus ensuring that quality of an improved method and characteristics of a new product can be confirmed.

In this manner, only the improved fundamental algorithm can be tested in advance but the elevator controller needs to be partly replaced with the new product.

Accordingly, the term for completion of actual improving work effected by carrying out, in response to requests for improvements, search, design of method and determination of changed/additional specifications and completion of confirmation of the degree of satisfaction with essential needs effected by conducting a search on actual performance and a questionnaire about easiness of handling approximately amounts to 3 months to one year in total, and consultation and tests can be accomplished only at the cost of a great expense.

Disclosed in JP-A-59-31266 and JP-A-59-48364 is a control system having a function to reserve events but this system can select only a method which can essentially comply with predeterminedly scheduled conditions, failing to immediately comply with the customer's needs which change in various manners.

The above prior art problems are due to the fact that the elevator maker does not have a counter-measure by which unexpected requests of the customer concerning the operation specifications can be dealt with easily.

SUMMARY OF THE INVENTION

An object of this invention is to provide a customer participatory elevator control system which can enable the customer to make a trial of the change of elevator call assignment control and guide control in response to a customer's request for change even when the customer's request is unexpected to the maker and which can change operation specifications completely after trial results are approved or accepted by the customer. More specifically, the present invention intends to construct a support system which can enable the customer to change elevator operation specifications by taking into account safety, high reliability and requests of the customer such as an elevator caretaker and elevator user, concerning the elevator operation specifications.

According to the invention, to accomplish the above object, elevator fundamental specifications and operation control constants are tabulated and rules for guide-/operation control are set up with the view of facilitating the change of functions in elevator operation and guide/control programs, and a trial operation control table for performing a trial pursuant to changed specifications is provided, whereby after the trial operation control table is written with data through a telephone line or the like, the data is checked accurately for rationality, and the trial can be executed at any time that suits convenience of the customer, for example, at night or during the absence of passengers staying in the cage.

The change is eventually settled after reliability of the data, safety of the elevator, satisfaction with feelings of the customer and agreement with general users are obtained and maintained. The term "feelings" referred to herein implicitly signifies "requests".

When a program adapted for new targets is prepared by means of, for example, an artificial intelligence (AI) tool or new operation specification data is prepared by means of a maintenance tool, the new program or data is stored in a trial program registration (saving) area through a transmission means.

The trial is practiced within a time zone suited for trial which is, for example, 9:00 to 9:30 A.M., following termination of peak of rush at the time to attend an office. In order to command a permission mode immediately after check of a completion of storage of the trial program and data, the trial program and data are used on trial as the operation control program in place of the conventional control program.

If abnormality (fatal irrationality of specifications, excessively large computed values, excess of program process time and so on) is detected during the trial, the trial can be stopped automatically to prevent the system from shutting down.

Accordingly, a function requested by the customer can be executed on trial only when the customer desires the execution, and another trial program can be prepared by taking into account the degree of satisfaction of the customer and the condition of utilization and reaction by the user as well as the condition of experience of the user.

Since the trial program can be copied into the control program after complete understanding and approval by the customer, the frequency of change can be reduced to decrease the term for improving work.

BRIEF DESCRIPTION OF THE DRAWINGS

FIGS. 9A to 9C show the structure of a call assignment rule table.

FIGS. 10A to 10C show the structure of a guide display rule table.

DESCRIPTION OF THE PREFERRED EMBODIMENTS

A preferred embodiment of a customer participatory elevator control system according to the invention will now be described with reference to FIGS. 1 to 16.

Figure 1:
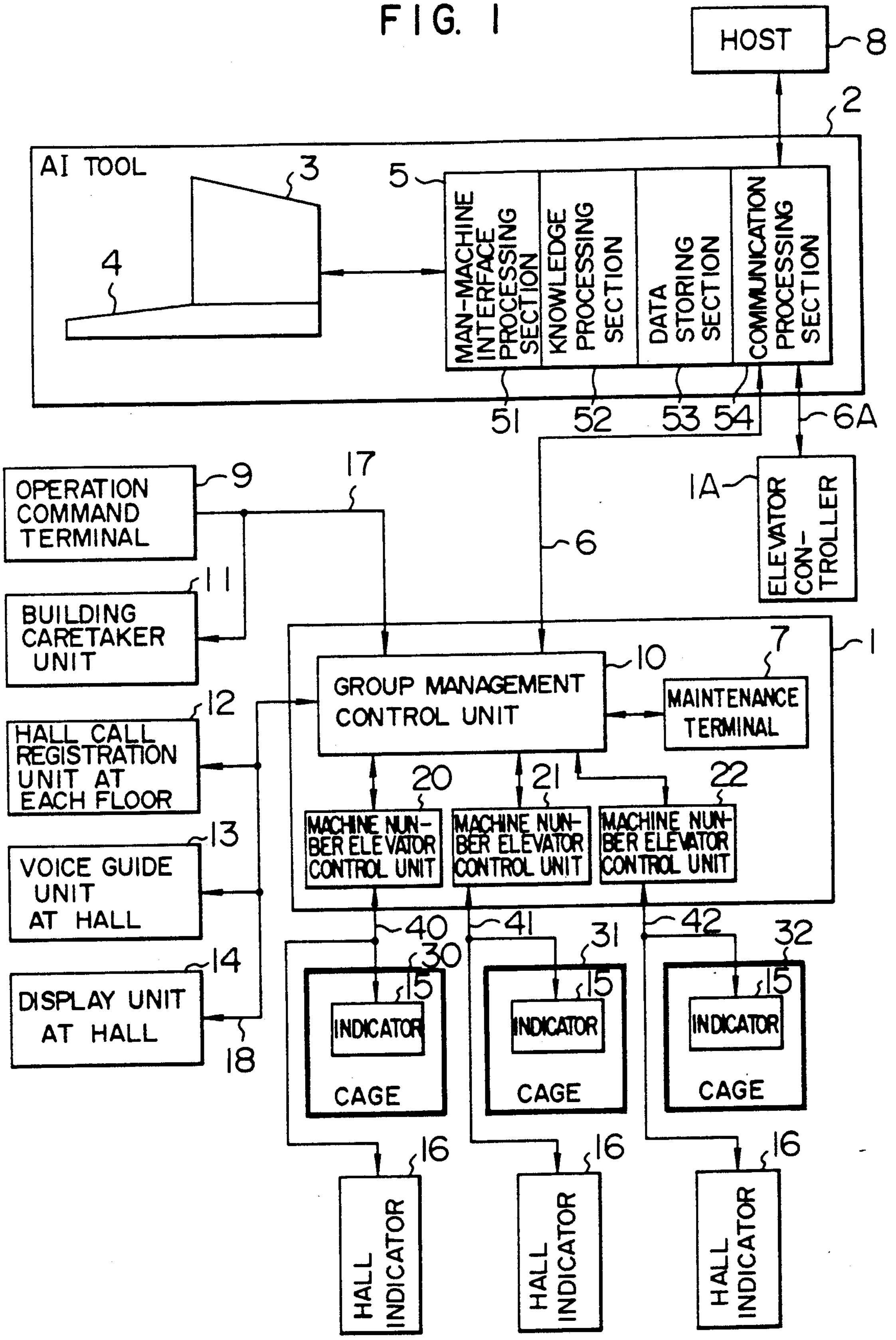
FIG. 1 is a block diagram illustrating the overall construction of an elevator control system according to the invention.

Particularly, FIG. 1 schematically illustrates the overall construction of the elevator control system. As shown, the control system comprises an elevator controller 1 constructed of a known microcomputer control architecture and including a group management control unit 10 and machine number elevator control units 20, 21 and 22 by which a plurality of machine number elevators are respectively controlled. The group management control unit 10 receives input signals from a hall call registration unit 12 at each floor and an operation command terminal 9 through transmission lines 17 and 18 and delivers output signals to a voice guide unit 13 at the hall, a display unit 14 at the hall and a building caretaker unit 11 through the transmission lines 17 and 18. The machine number elevator control units 20 to 22 for running control and door control of individual elevator cages 30 to 32 are operable to control individual in-cage indicators 15 such as in-cage displays or in-cage voice guide devices and hall indicators 16 for individual machine number elevators such as hall lanterns or chimes, through transmission lines 40 to 42. An AI tool 2 is connected to the group management control unit 10 by a communication line 6 in this embodiment but this manner of connection is not limited, permitting the connection to be set up in different ways, for example, through the use of a recording medium. The AI tool 2 is a generally sold work station. For example, an AI tool for an elevator formed of an expert system constructing tool ES/KERNER of a work station 2050 manufactured by HITACHI, LTD. is available. To put it briefly, the AI tool 2 comprises a CRT 3, a keyboard 4 and a processor 5 which includes a section 51 for control/ processing of man-machine interface, a section 52 for knowledge processing such as deduction, a section 53 for storage of knowledge (data) and a section 54 for control/processing of communications with the elevator controller 1. In some applications, the communication processing section 54 may also be connected with a host computer 8 for collectively controlling the whole of maintenance service and another elevator controller 1A. The CRT 3, keyboard 4 and operation command terminal 9 may be constructed integrally in the form of a touch panel display or a CRT with a mouse to thereby improve ease of operation by the general user.

Since the AI tool 2 is expensive in general and requires its user to be experienced to some extent, it may sometimes be installed in a maintenance center of a maintenance company which is outside the building of interest. In such an event, the AI tool 2 may be connected to selected ones of the elevator controllers 1 and 1A through telephone line 6 or 6A. The AI tool 2 operates, sequentially or in accordance with requests of the customer, to diagnose abnormality and adaptive control conditions and to decide/support feeling targets and requests for new operation. This AI tool 2 is also operable to perform storage and management of various kinds of data collected for diagnosis and to perform reporting.

Part of the processing function of the AI tool 2, especially storing of data put in order according to individual delivery destinations and retrieval based on key words, may be put under charge of the host large-scale computer 8.

In this embodiment, a maintenance terminal 7 is disposed in the elevator controller 1 (for example, elevator machine room) in consideration of security managed by the elevator maker or maintenance company, but it may otherwise be installed, as necessary, at a location intimately connected to an elevator operation caretaker such as represented by the caretaker room or the general affairs division in the building.

The maintenance terminal 7 is operable to carry out a processing which diverts the control program to a trial program by copying program data and specification data so as to correct part of the trial program. In particular, the maintenance terminal 7 is designed to achieve preparation of the trial program independently of or without assistance of intelligent support from the maintenance center such as AI tool 2 or host computer 8 and can operate independently even in the event that the maintenance center is under construction or inspection or in the event that a reconstruction program preparation support can not be obtained from the AI tool 2, as in the case where elevators are installed in, for example, an oversea building and are not connected to the maintenance center through a telephone line or the like.

The maintenance terminal 7 also plays a role in performing confirmation based on the trial program and this function is important when the elevator maintenance engineer or inspector carries out, in accordance with a request of the customer or a formal reconstruction contract, an operation to correct or increase the control program on the basis of a program contained in the trial program area.

The operation command terminal 9 also participates in the present invention and like the maintenance terminal 7, this terminal 9 may preferably be disposed at a location intimately connected to the elevator operation caretaker. The operation command terminal 9 is operable not only to command a parking floor and a parking time zone, to switch the service floor (nonstop floor) and to switch divisional express manually but also to command starting, terminating and pausing of the execution of the trial program. Frequently, the function of the operation command terminal 9 is partly or entirely put under the charge of the building caretaker unit 11 and this terminal 9 may be designed to be an extension terminal of the building caretaker unit. In the FIG. 1 embodiment, the independent installation design is thought much of and the operation command terminal 9 is coupled to the elevator controller 1 through a bus-type transmission line 17.

In an alternative, the function of the operation command terminal 9 may be put under charge of a customer's multi-functional telephone set installed outside the building.

As described previously, the hall call registration unit 12, voice guide unit at hall 13 and display unit at hall 14, which are distributed to halls on respective floors, are connected to the elevator controller 1 through data transmission line 18.

In a single elevator, the group management control unit 10 is not provided and therefore the transmission lines 6, 17 and 18 and the maintenance terminal 7 are connected directly to one of the machine number elevator control units 20 to 22 which is extended in function of hall call registration and transmission processing so as to be dedicated to the single elevator, thereby ensuring that trial operation in accordance with the same trial program as above can be practiced.

Essentially, the provision of means for setting and storing information necessary to operate elevators on trial is of significance and the invention is in no way limited to the construction shown in FIG. 1.

Figure 2:
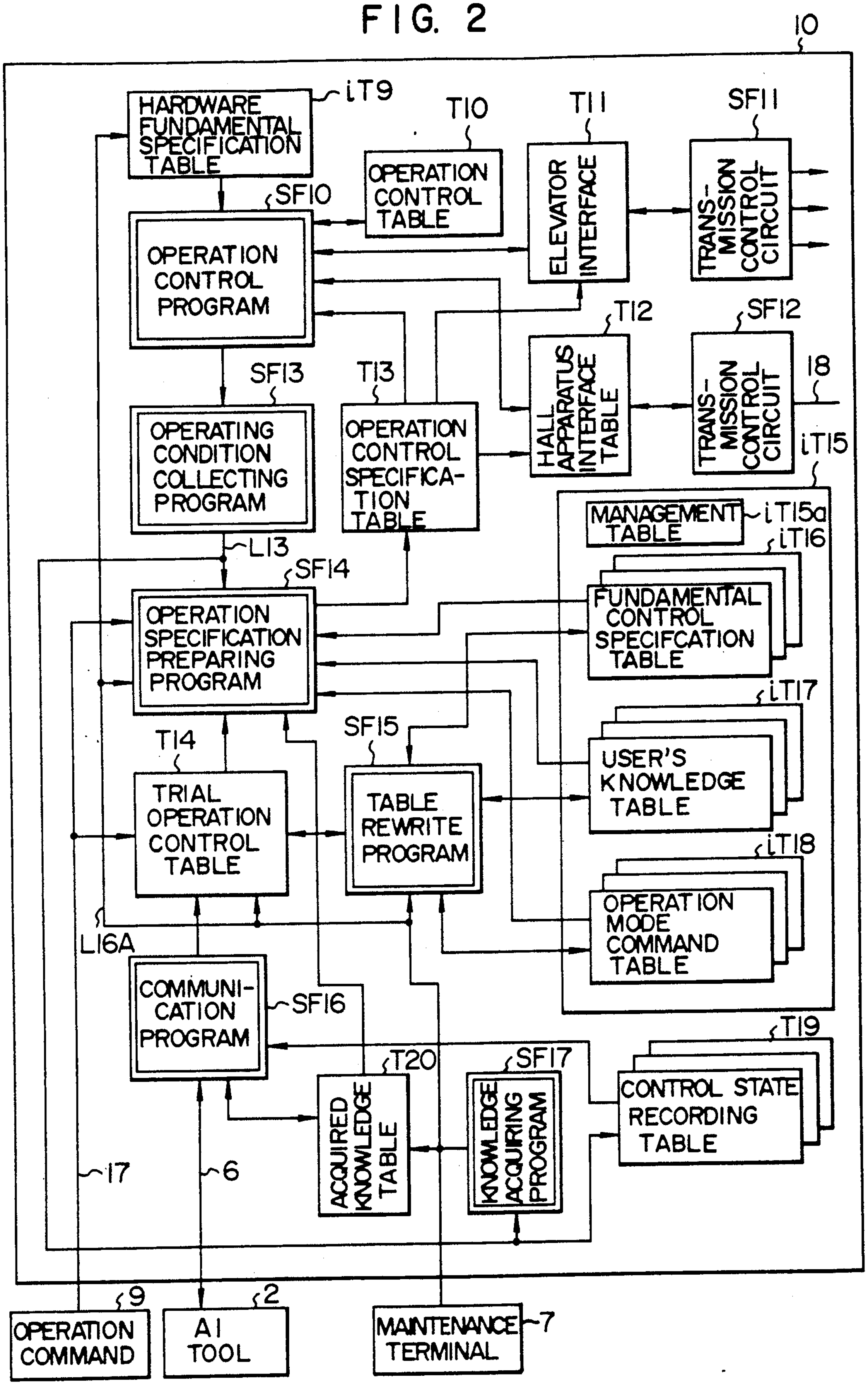
FIG. 2 is a block diagram illustrating the construction of a group management control unit shown in FIG. 1.

FIG. 2 schematically illustrates, in block form, an embodiment of the construction of the group management control unit 10.

Figure 12:
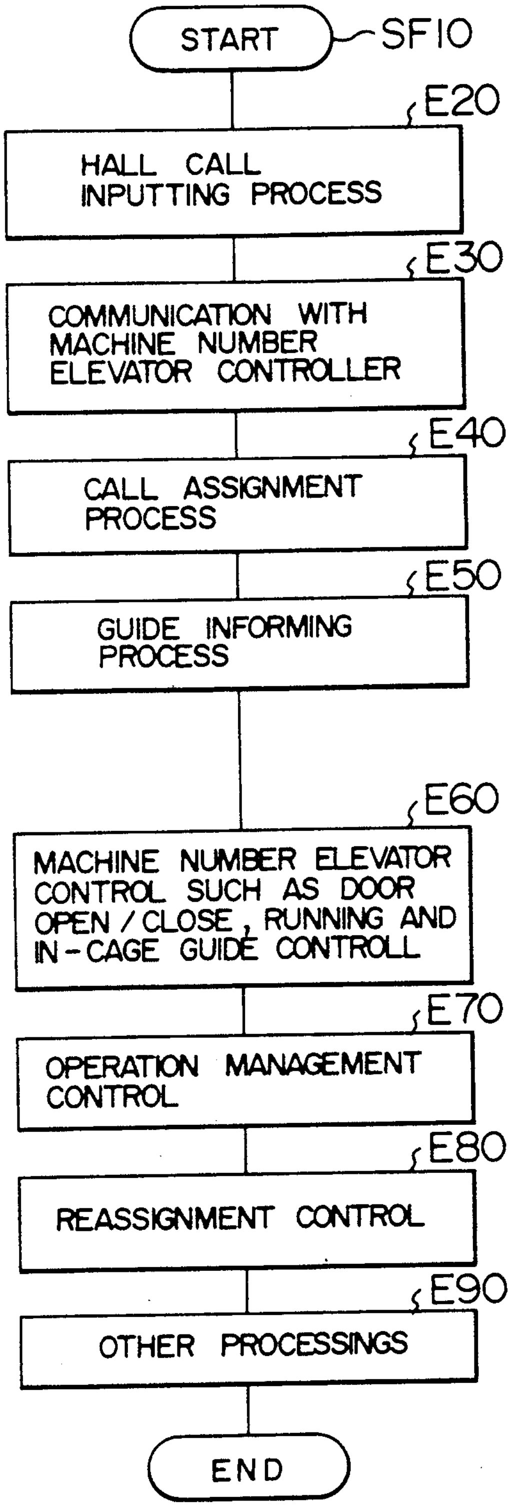

An operation control program SF10 looks up an operation control specification table T10 to directly command and control group management operation control including hall call registration control, assignment control, service elevator guide control, operation management control for, for example, dispersive operation and divisional express operation and general living information guide control. A specific example of this control program is shown in FIG. 12.

An elevator interface T11 commands a door open/-close driving mode code and data, and a door open/close controlling mode code and data for deciding, in addition to door open time, valid and invalid time limits to closed button and opened button, to the individual machine number elevator control units 20 to 22 through a transmission control circuit SF11 in order to manage and control the general operation form of each elevator.

Further, a hall apparatus interface table T12 commands a guide control mode code and data to the display unit at hall 14 (see FIG. 1) having several forms of guide control function, through a transmission control circuit SF12 in order to manage and control the forms of service guide and information guide. For the voice guide unit 13 (see FIG. 1), guide number and sound volume data are prepared and guide control is directly commanded to the unit 13.

In accordance with an operating condition collecting program SF13, traffic is sequentially collected by consulting the number of passengers who get on and off at each floor and the number of baggages on wagons, and various service conditions determined by control targets are collected.

For example, the operation frequency of door open/-close button, the condition of the occurrence of delay in departure due to safety shoe operation, the condition of use of counter-directional riding caused by the occurrence of jam due to nonstop of full-up cage, the condition of the occurrence of rejected embarkation due to crowded cage service, the condition of the occurrence of a cage call at the lobby floor and restaurant floor and the information about secondary characteristics of traffic such as represented by the time required for moving from a push button installed at a slightly distant location and the time required for getting on and off are also collected to prepare a control condition recording table T19.

Further, the pitch between adjacent floors, the door open/close width, the door open/close driving time pursuant to the types of mode and the running time are actually measured and measurement results are arranged and stored in the control condition recording table T19 in accordance with the types of traffic mode or the types of user management mode.

In accordance with a knowledge acquiring program SF17 for acquiring necessary knowledge for control on the basic of operating condition collecting data L13, not only the representative vector, of traffic is corrected and a new traffic mode is generated (addition of a representative vector) but also the full-up level is corrected, correction data of jam feeling data is prepared and optimum values of predictive arrival time preparing parameters are calculated, and results are stored in an acquired knowledge table T20.

An operation specification preparing program SF14 responds to the present operating condition collecting data L13 and data of an operation control form decision table iT15 and in accordance with this program SF14, an operation control specification table T13 is prepared at a predetermined period (for example, each time one cycle of the excursion of elevator ends) or each time a predetermined condition is established (for example, each time data indicative of the passenger number being 100 is collected and detected), in order to attain operation control adapted for the present utilization condition and management target command.

The operation control form decision table iT15 includes a management table iT15a, a fundamental control specification table iT16 for determining floors to be served by individual machine number elevators, a knowledge table iT17 for storing knowledge of the user such as the degree of user's feeling for longtime waiting, and an operation mode command table iT18 for designating the kind of operation program such as call assignment, guide or running management and commanding necessary detailed rules and data.

Various types of most advanced control algorithm have ever been proposed and they can be collected completely to provide the construction described as above.

The present invention adds to this construction a support system by which the customer inclusive of an elevator caretaker and an elevator user (hereinafter simply referred to as the user) per se can decide the elevator operation specification by taking into account safety, high reliability and participatory interest of the user in elevator control. The previously-described maintenance terminal 7 responds to a table rewrite program SF15 to prepare and execute a trial program and to partly renew a trial operation control table T14 and a hardware fundamental specification table iT9.

Similarly, the AI tool 2 accesses a communication program SF16 to prepare the trial operation control table T14 and to read part of the operation control form decision table iT15.

In order to acquire information necessary for improvement diagnosis and target attainment control, the AI tool 2 is also operable to receive data from the control condition recording table T19 and acquired knowledge table T20. Highly advanced knowledge acquired by the AI tool 2 can in turn be stored in the acquired knowledge table T20.

The operation command terminal 9 is operable to register execution conditions (for example, traffic and time zone) in the trial operation control table T14 and to command the start command or pause command to the operation specification preparing program SF14, so that the trial operation can be controlled.

FIGS. 3 to 5 and FIGS. 6A to 6D show table structures of software used in the group management control unit 10, these table structures being designated by the same reference characters as those in FIG. 2.

Figure 3:
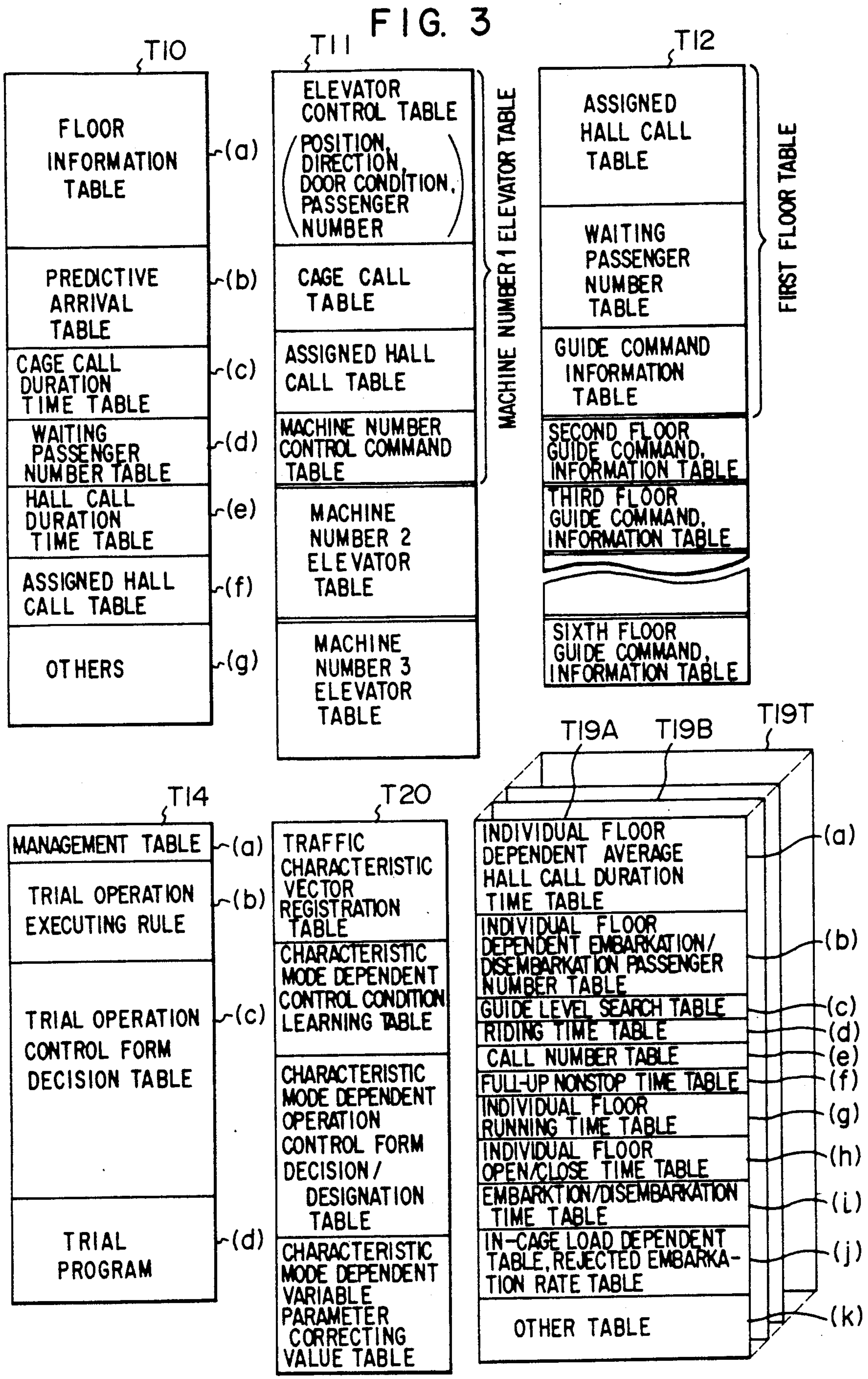
FIGS. 3 to 5 and FIGS. 6A to 6D show structures of software tables including a floor information table.

Referring to FIG. 3, the operation control table T10 has a structure which stores a floor information table (a), a predictive arrival time table (b) and so on which are necessary for execution of the operation control program SF10 as detailed in FIG. 12. The elevator interface table T11 has a structure which stores an elevator condition table, a cage call table, and so on. This structure is partly identical with that of the operation control table T10 by storing an assigned hall call table (f). The elevator interface table T11 is transmitted to and received from the individual machine number elevator control units 20 to 22 through the transmission control circuit SF11. The hall apparatus interface table T12 has a structure which is partly identical to the operation control table T10 by storing the assigned hall call table (f) and a waiting passenger number table (d) and it is transmitted to and received from the hall call registration unit 12 installed at the hall through the transmission control circuit SF12 for data transmission. The trial operation control table T14 has a structure which stores a management table, a trial operation executing rule, a trial operation control form decision table and a trial program in which information necessary for trial operation is set and stored. The acquired knowledge table T20 has a structure which stores a traffic characteristic vector registration table, a characteristic mode dependent control condition learning table and so on which stand for knowledge acquired by the knowledge acquiring program SF17 (or AI tool 2). The control condition recording table T19 consists of individual tables T19A to T19T having each a structure which stores an individual floor dependent average hall call duration time table, an individual floor dependent passenger number table and so on which stand for information about secondary characteristics of traffic. The tables shown in FIG. 3 may be constructed of RAM's and in particular, RAM's with power-failure backup may be used for the tables T14, T20 and T19.

Figure 14:
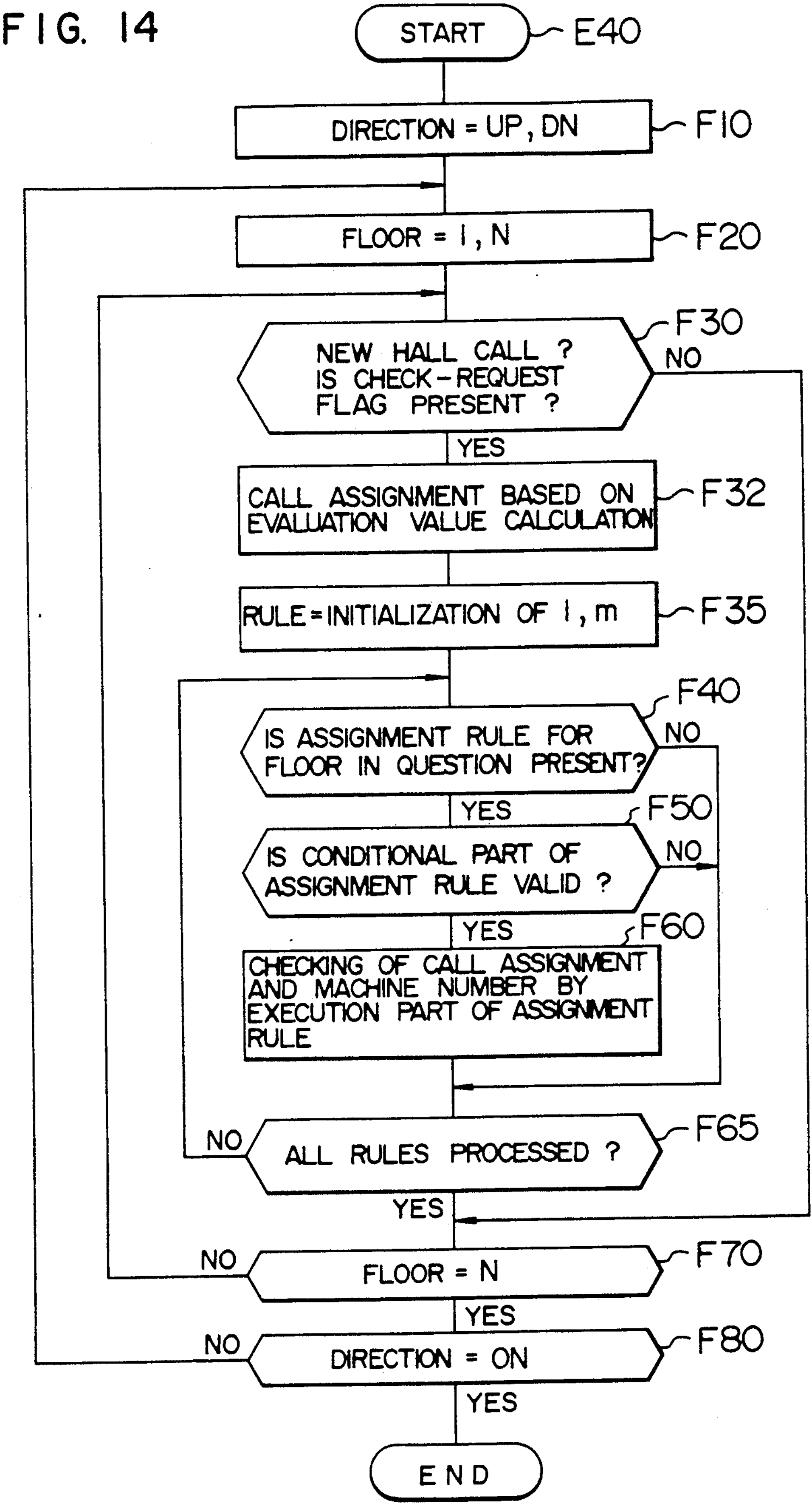
FIG. 14 is a flow chart for execution of processings in a call assignment process as executed in step E40 in FIG. 12.
Figure 16:
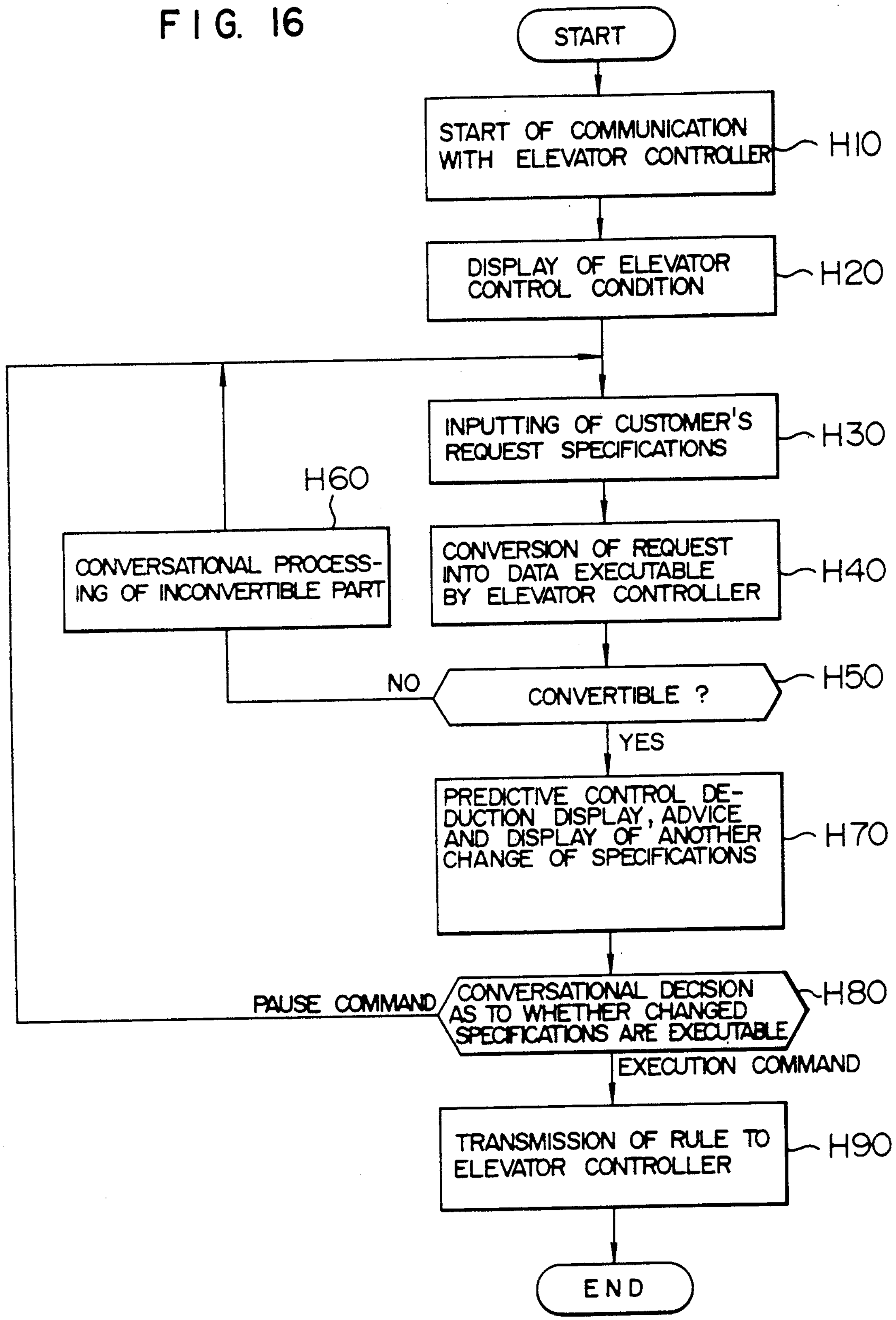
FIG. 16 is a flow chart for execution of processings in an AI tool 2.

The operation control table T10, which is partly identical to the tables T11 and T12 by having the floor information table (a), waiting passenger number table (d) and assigned hall call table (f), is so designed as to meet efficient execution (high-speed processing) of program procedures as shown in FIGS. 14 and 16. For example, in the floor information table (a), various kinds of data are broken down and arranged in accordance with the individual machine number elevators and individual floor numbers. This is exemplified in FIGS. 6A to 6D as will be described later.

Figure 4:
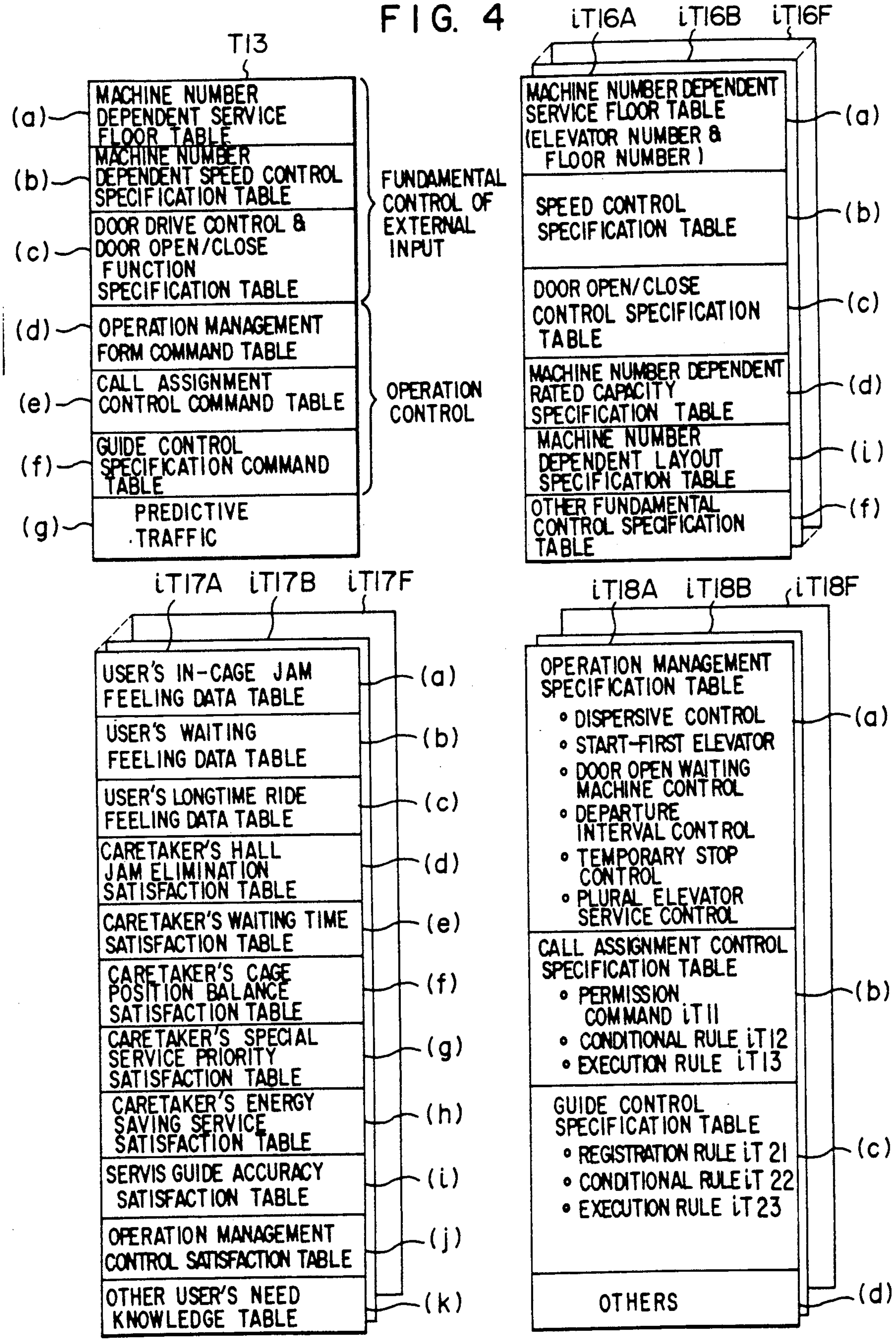

Referring to FIG. 4, the operation control specification table T13, and the fundamental control specification table iT16, user's knowledge table iT17 and operation mode command table iT18 of the operation control form decision table iT15 have structures as shown therein.

Figure 5:
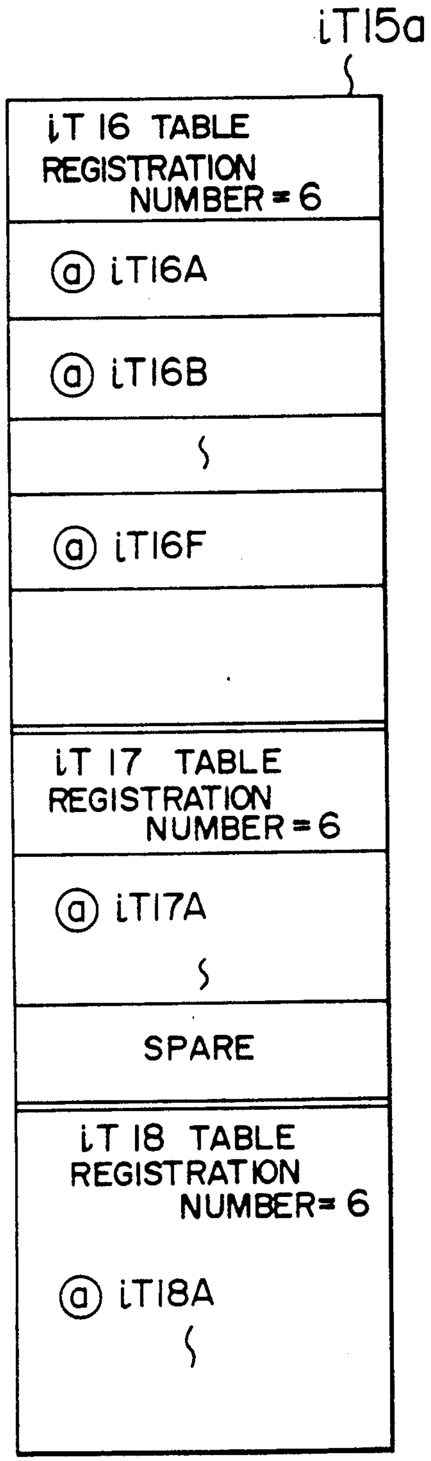

FIG. 5 shows a structure of the operation control form decision table iT15 shown in FIG. 2 which includes the management table iT15a, fundamental control specification table iT16 (in this embodiment, the number of registration tables is 6), user's knowledge table iT17 and operation mode command table iT18.

The whole of the operation control form decision table iT15 shown in FIG. 5 may be realized with a memory card, a ROM cartridge, an IC memory card or an EEPROM.

The floor information table T10-(a) of operation control table T10 is specifically constructed as shown in FIGS. 6A to 6D.

Figure 6A:
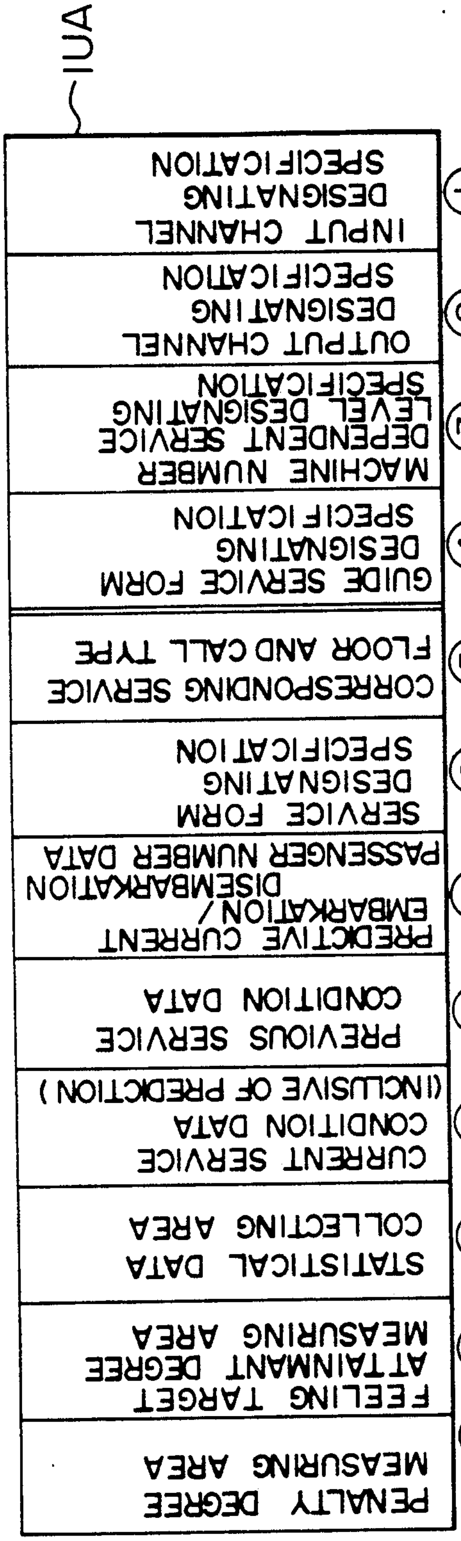
Figure 6B:
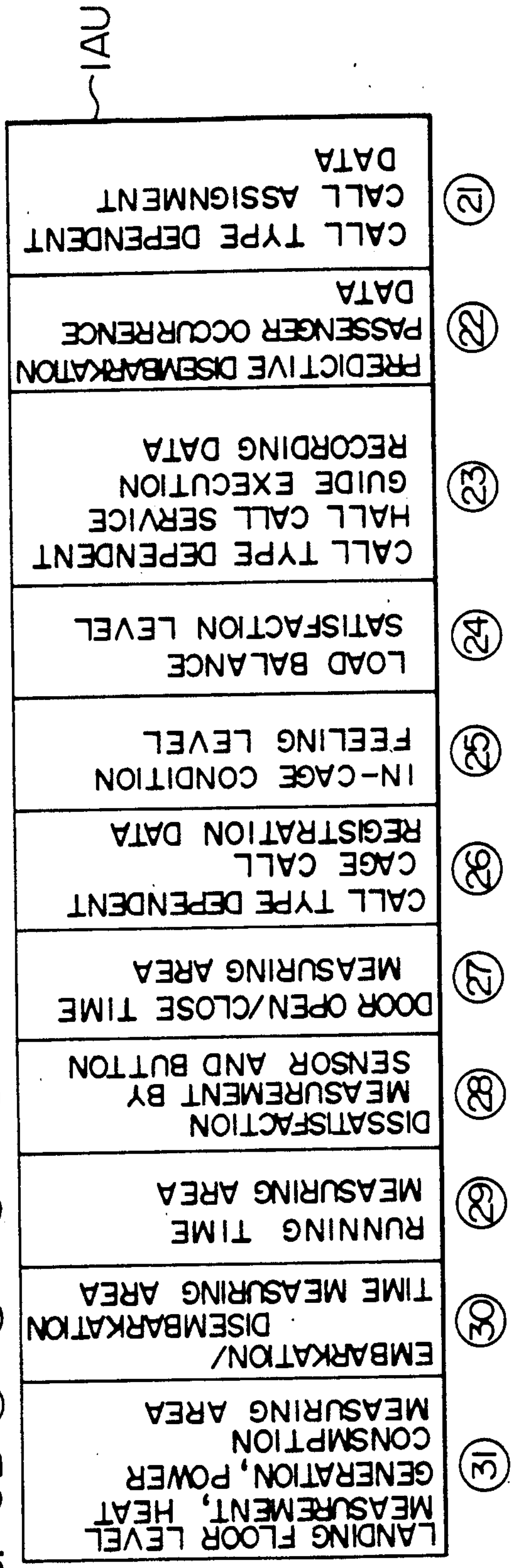
Figure 6C:
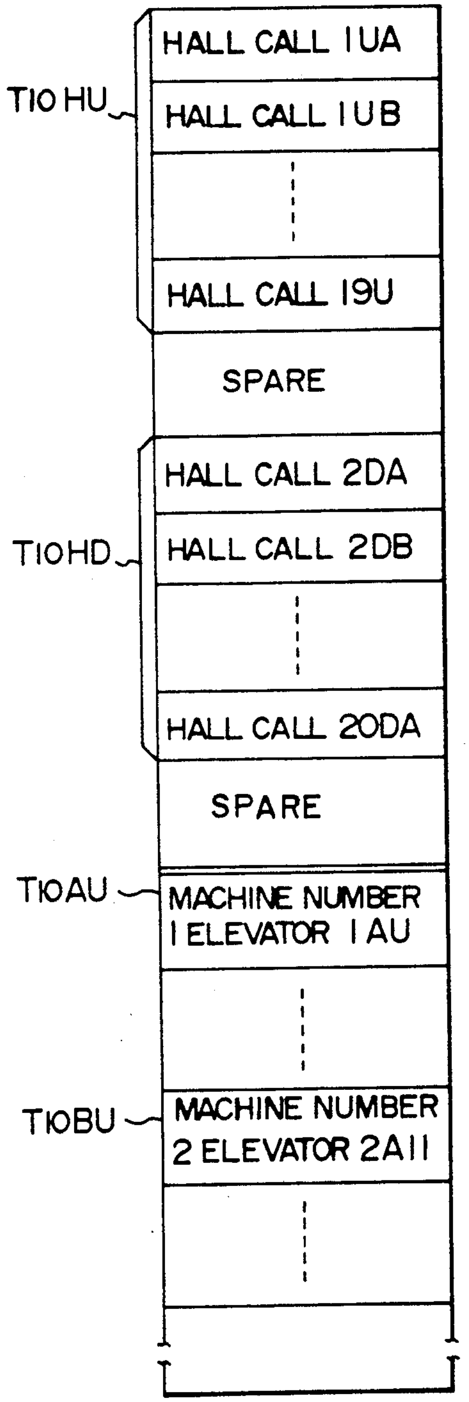
Figure 6D:
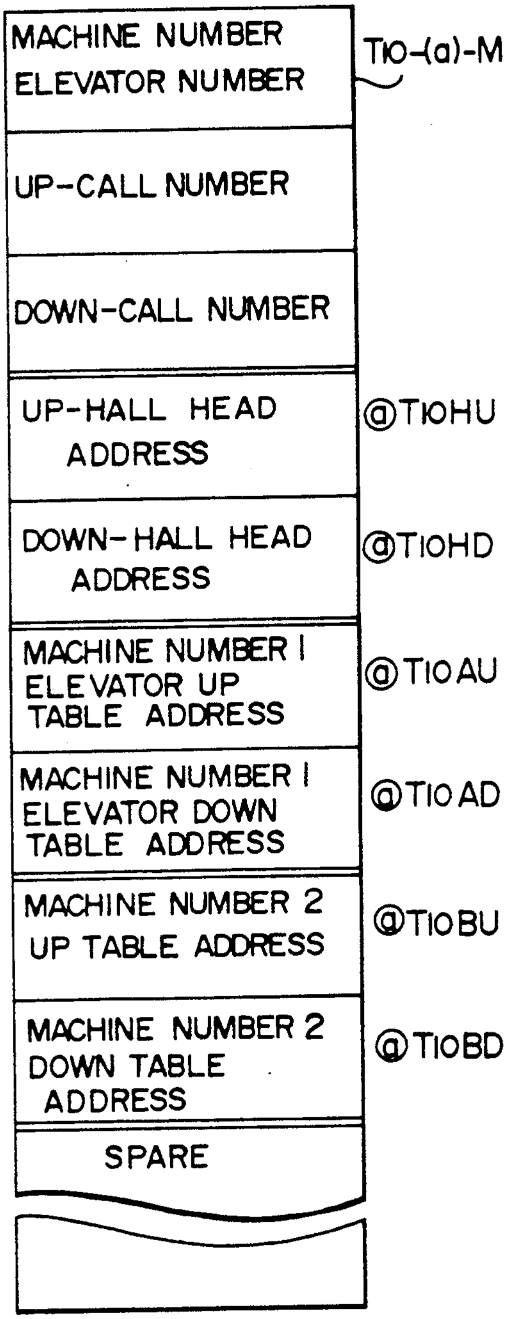

First, FIG. 6D shows a table for managing the whole of the floor information table T10-(a) and in this management table, the number of machine number elevators and hall calls as well as head addresses of specified data storage areas T10HU and others are registered in order to fully take advantage of the table resources.

FIG. 6A shows an example of a table in which the control specification and control condition data are arranged in accordance with individual registration units. A plurality of tables of this type are provided for different types of calls or provided for parallel calls of the same type in one-to-one relationship each hall switch button.

Accordingly, in a case where 7 call registration units for 7 different types of calls are installed on the same floor, 7 table areas 1UA to 1UG are provided in the up hall call table T10HU. Control conditions of individual elevators are arranged in a table shown in FIG. 6B. This table is provided for each elevator and stored in accordance with floor numbers and directions. In this manner, various kinds of floor dependent data common to all of the machine number elevators are prepared in accordance with the types of call input means. Further, various kinds of floor, direction and machine number dependent data are arranged in accordance with the types of floor and direction to improve efficiency of processing.

An input channel designating specification ① and other specifications ②, ③, ④ and ⑤ in the table 1UA are prepared on the basis of data defined by the hardware fundamental specification table iT9 under the command of abolition and unification according to an operation management form command table T13-(d) in FIG. 4, and a temporary pause of Vip and wheelchair call service during the peak hour. The machine number dependent service level designating specification ③ is used for preferentially servicing elevators on the same side and an elevator near the input operation means.

"Penalty degree" ⑫ signifies the frequency of occurrence of conditions which should be decided to be corrected including the frequency of change of service guide, the frequency of occurrence of a pass-by elevator which passes by a floor where a longtime waiting call takes place and the frequency of occurrence of a nearby-floor waiting elevator.

"Feeling target attainment degree" ⑪ is measured and recorded in accordance with individual items of the user's knowledge table iT17, totalled or cleared in accordance with predetermined conditions and subjected to a statistical processing such as exponential smoothing.

For the purpose of improving accuracy of prediction of the number of recent passengers, the number of waiting passengers at individual elevator halls is detected and used for reference.

Data in elevator dependent floor information table 1AU will now be described.

data ㉑ signifies the presence or absence of hall service call assignment put under charge of the current machine number 1 elevator and the type of the assignment.

Data ㉒ can be calculated from the sum of predictive passenger number in cage and embarkation passenger number, floors expected to serve for disembarkation service and old traffic.

Data ㉓ is used to record history of guide control for the user, including the information as to whether an elevator in question has already experienced service guide, the frequency of reservation change and nonstop and the frequency of first arrival, so as to control suppression of frequent penalty operations.

Figure 7A:
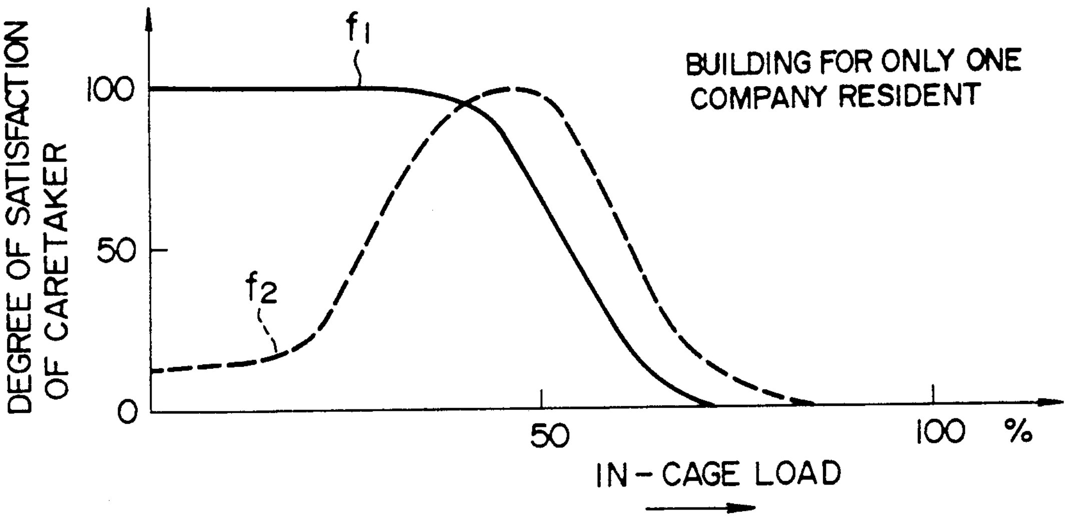
FIGS. 7A and 7B are graphs showing the relation between in-cage load and degree of satisfaction of the caretaker and the relation between in-cage load and easiness of handling.

Data ㉔ is stored data representative of load balance satisfying degree level determined on the basis of a loading value in cage obtained upon arrival at a floor in question and a caretaker's satisfaction degree level conversion function $f_1$ (for leisure time) or $f_2$ (for rush hours) as shown in FIG. 7A. This data is used in control in such a manner that new assignment to an elevator having "0" value of this data is inhibited and that when the value of this data reaches "0" in an elevator which has already undergone assignment, assignment for the assigned call originating floor and a floor in advance thereof (preferably under non-service guide) is transferred to another elevator.

Figure 7B:
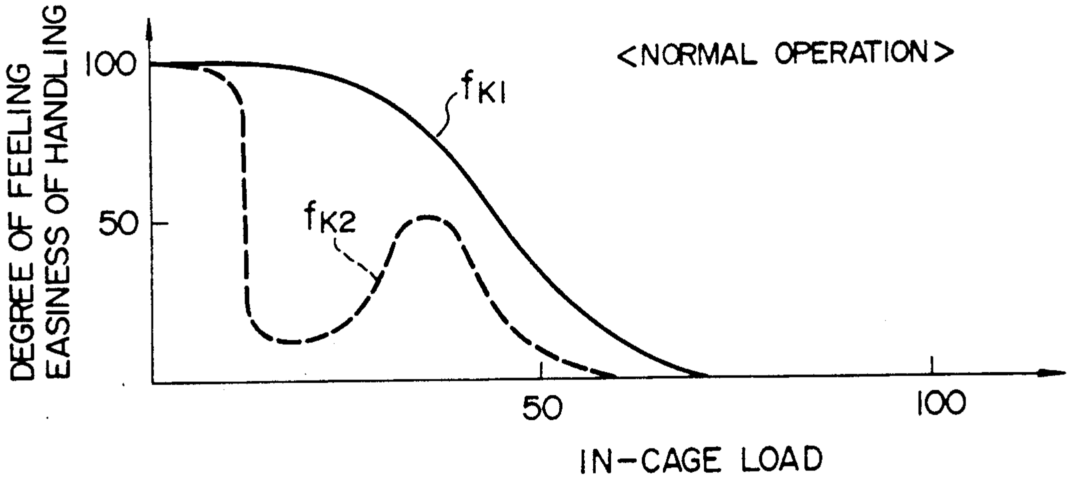

Data ㉕ is stored data representative of levels determined from an easy-to-ride cage condition feeling degree level conversion function $fk_1$ (for building in which only one company resides) or $fk_2$ (for hotel or station building) as shown in FIG. 7B. The degree of agreement, felt by the user, with a crowded condition in the cage can be converted into a physical quantity through the conversion function.

In proportion to the magnitude of value of this data, the call assignment for a floor of interest becomes more acceptable.

With the view of improving transport capability during rush hours, the conversion function $f_2$ is set such that the satisfaction degree matches low loading in consideration of good load balance.

The conversion function $fk_2$ is used for hotels and like buildings in which the number of users is large and indefinite. Accordingly, in controlling in this type of a building, the occurrence of stay of 2 to 3 passengers in a cage is suppressed as far as possible from the standpoint of crime prevention in order to avoid degradation of boarding efficiency which is caused by the fact that, for example, passengers who are going to get on a stopping elevator find, for example, a very tall man staying in the cage and intentionally pass this elevator in fear of him.

These conversion functions are stored in a table (a) of each of the user's knowledge tables iT17A to iT17F. By using the AI tool 2, the conversion function can be renewed to a new conversion function which matches the individuality of the user. This new conversion function may be stored in the trial operation control table T14 and after execution of trial operation, put in use.

Data ㉚ is for embarkation/disembarkation time measurement and will be explained by way of acquisition of knowledge of the user.

Embarkation time is sorted into time for the first embarkation passenger, time for the second and ensuring embarkation passenges and time for additional embarkation (when the door once closed is reopened by actuation of an open button or by a call from the hall) and these kinds of time are learned.

The first embarkation passenger is sorted into a passenger who has been waiting for a service guide elevator and a passenger who has just reached a floor at which an elevator has arrived or is arriving.

Further, time required for movement and embarkation is measured in accordance with positions where operated hall buttons are installed.

Various kinds of learning data ㉗ to ㉛ are subjected to statistical processings at the rate of 1 to 30 minutes at the operating condition collecting program and used for knowledge acquisition or as report data sent to the AI tool.

As exemplified in FIG. 6C, these elements of data are arranged in individual floor dependent control data tables T10HU, T10HD -----.

The operation program SF10 retrieves tables through the management table shown in FIG. 6D and in this program, the sequence is not set up among blocks and unit of block can be moved to an unoccupied area.

Structure and operation of other tables shown in FIGS. 2 and 3 will now be described.

A management table (a) in trial table T14 registers the head address of a trial program (d) and the number of rules and structurally resembles the management table iT15a shown in FIG. 5.

The operation control specification table T13 is prepared (step A20 in FIG. 11) every minute, in accordance with the operation specification preparing program, from knowledge and data acquired by the elevator controller 1, such as current utilization condition data (the output L13 from program SF13) and utilization condition learning data (tables T19 and T20) resembling changing condition of old traffic, and data of the operation control form decision table iT15 which is likely to meet a variety of customer's needs. Tables (a) to (d) in the operation control specification table T13 shown in FIG. 4 are automatically prepared from time zone, traffic and event schedule in fundamental control specification tables iT16A to iT16F in accordance with the user's knowledge table iT17 set for attainment of user's control targets and operation mode command tables iT18A to iT18F. But, when nonstop, preferential service and jam mitigation operation are commanded by the elevator monitor panel, building caretaker unit 11 or operation command terminal 9, these operations are executed preferentially.

A call assignment control command table (e) in operation control specification table is prepared, on the basis of a call assignment control specification table (b) of each of the operation mode command tables iT18A to iT18F, in the form of a format which is easy for a call assignment processing E40 (detailed in FIG. 14) in the operation control program SF10 (FIG. 12) to use.

Similarly, a guide control specification command table (f) in the operation control specification table T13 is prepared on the basis of a guide control specification table (c) in each of the operation mode command tables iT18A to iT18F, to achieve guide control in accordance with specifications adapted for occasional utilization condition or predictive utilization condition.

A predictive traffic table (g) in the operation control specification table T13 is prepared on the basis of conditions of traffic which is the fundamental elevator utilization condition, especially, by deriving the condition of change of traffic within several to several of tens of minutes obtained till then and old data representative of various conditions of traffic occurrence from an individual floor dependent embarkation/disembarkation passenger number table (b) in each of the control condition recording tables T19A to T19T (see JP-A-59-48369). To obtain more accurate predictive traffic, data representative the number of passengers who pass through the entrance and exit of building and the number of passengers waiting at the elevator hall can preferably be added.

The fundamental control specification table iT16 has tables for determining the way in which the user uses values in the hardware fundamental specification table iT9 which define the specifications of elevator equipment including the maximum rated capacity, the maximum speed, the number of service floors with entrance and exit, the number of installed elevators, the maximum door open/close speed, the door open width and the maximum acceleration/deceleration of cage. Six tables are provided which are specified for (1) jam hours during which operation is carried out with the cage speed and door open/close speed maximized, (2) peak service hours during which service floors are divided, some service floors are skipped over and hall call service in a specified direction is cut in respect of some floors, (3) normal or leisure hours during which leisurely feeling is thought much of by reducing the rated capacity to avoid concentration of service on crowded cages, reducing the door open width and reducing the door open/close speed and elevator acceleration, and (4) two types of elevator operations which are served on specified days exclusively for employees and general users, respectively, during the term for reception or at night.

In respect of each of the above elevator utilization sorts, the user's knowledge table iT17 provides data representative of feeling for jam in cage and waiting time in terms of evaluation priority or membership function in accordance with the types of call and floor numbers.

An operation management specification table (a) in the operation mode command table iT18 defines, in respect of each elevator utilization sort, dispersive control specifications indicative of dispersive floors and the number of dispersive elevators and algorithms for placing one or two cages in condition for waiting with their doors opened or controlling interval of departure of the cages at a specified floor such as lobby floor, basement floor for restaurant or top floor for restaurant, the algorithm being such that the cage is permitted to start in response to a call originating from another floor after expiration of an interval of time pursuant to, for example, ($\frac{1}{2}$ of average time for one cycle of excursion)×

$$\left(\frac{1}{\text{the number of elevators in service}}\right),$$

that a non-full up elevator will not be passed by but will be stopped temporarily and that when only one elevator or cage to be serviced for the specified floor is waiting, the other elevator is called.

Figure 8A:
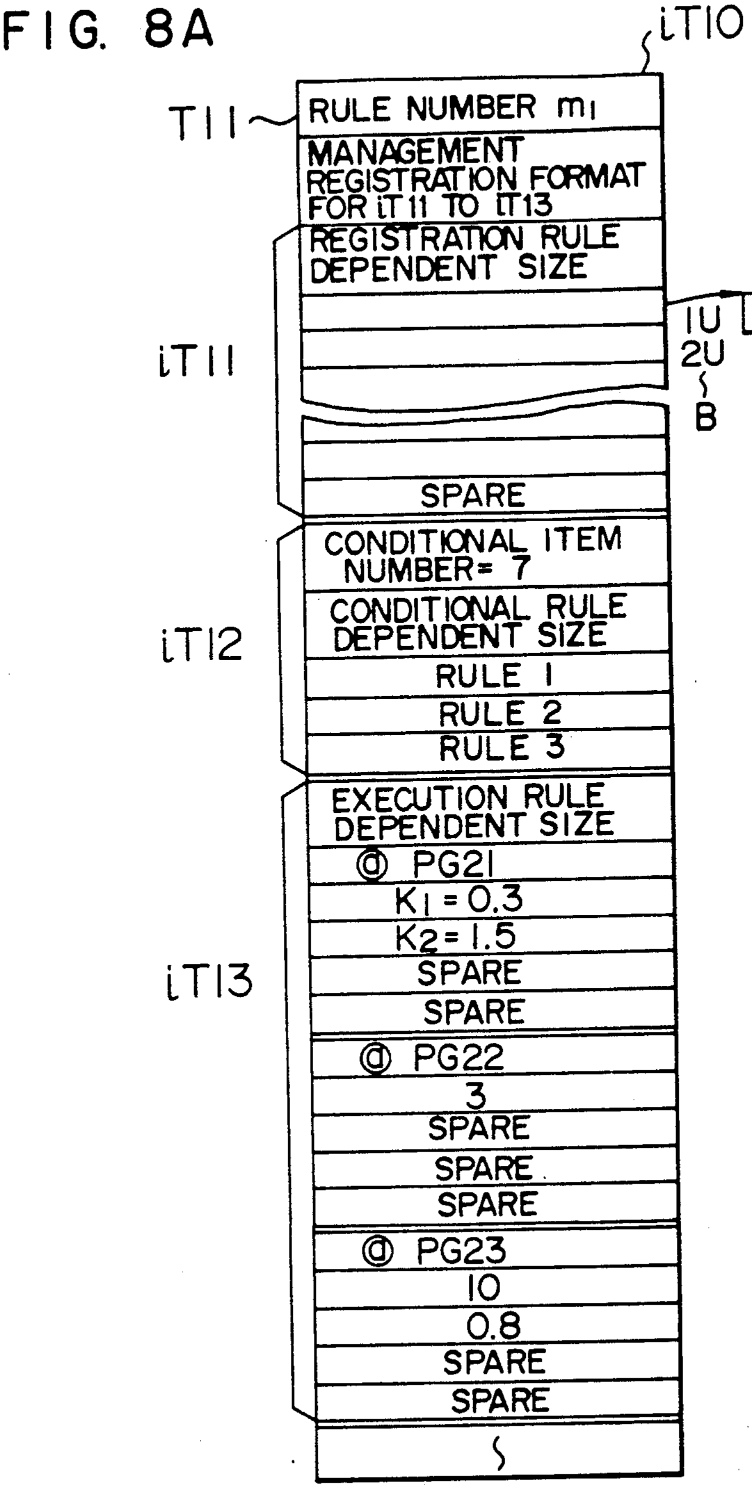
FIGS. 8A to 8C show the structure of a call dependent special call assignment control specification table.
Figure 8B:
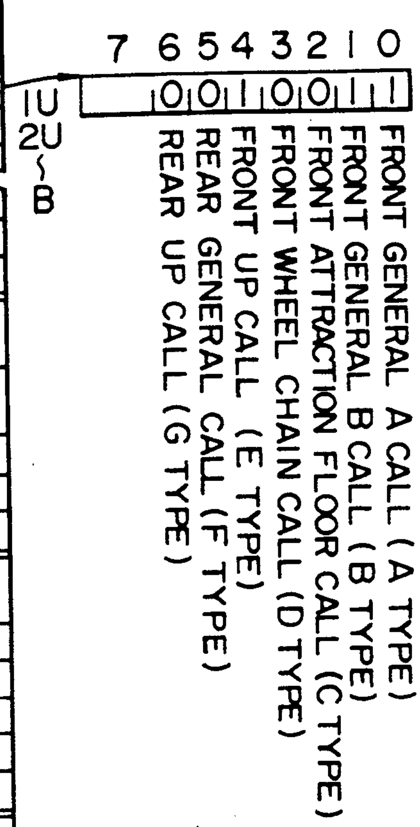

FIGS. 8A and 8B show part of the call assignment call specification table (b) in the operation mode command table iT18, especially an example of particular specifications of call assignment. This example is detailed in FIGS. 9A, 9B and 9C.

Part of the guide control specification table (c) is detailed in FIGS. 10A, 10B and 10C.

Many kinds of the specifications are provided and they are automatically changed for use in accordance with traffic, time zone and event reservation.

An example of a call dependent special call assignment control specification table iT10 shown in FIG. 8A has a management table for storing the number m of rules and head addresses of specification tables iT11 to iT13 and a registration rule table iT11 following the management table. Registration flags are set bit by bit in correspondence to individual rules as shown in FIG. 8B.

Figure 8C:
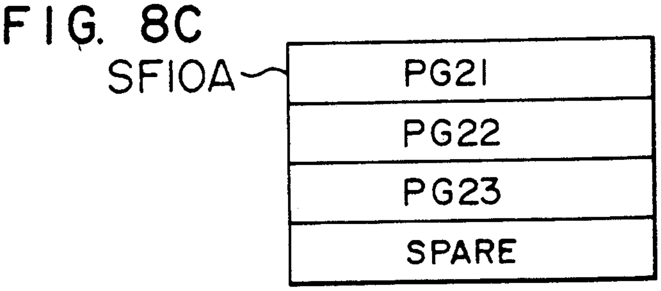

Then, a condition rule table iT12 and an execution rule table iT13 follow. The specification table iT10 is set in respect of each of the operation mode command tables iT18A to iT18F and is used when the operation control specification table T13 is prepared in accordance with the operation specification preparing program SF14. As a rule, the contents of programs PG21 to PG23 in the execution rule table may be stored in the operation control program SF10A shown in FIG. 8C, as a portion of the program SF10 shown in FIG. 2. In this case, a program storing table SF10A of operation control program SF10 as shown in FIG. 8C may be used in common for the programs PG21 to PG23 in the execution rule table. In the execution rule table iT13, program storing addresses, program registration numbers and parameters used for the execution programs are stored.

With this construction, flexibility can be improved and efficiency of preparing the trial control program can be improved. Further, the time required for starting/ending the trial control operation can be decreased.

The call assignment rule table consists of three parts as shown in FIGS. 9A, 9B and 9C. The registration rule table iT11 shown in FIG. 9A indicates whether rules to be applied to individual floors in accordance with directions of elevator movement are defined. In FIG. 9A, an "0" mark is allotted to blanks where rules are defined. This example indicates that for an up-call 3U at the third floor servicing many visitors, rule 1 (suppression of assignment to a crowded elevator) and rule 3 (suppression of assignment to an elevator for which the waiting time is too short) are registered and for down-calls 3D and 6DB at the third and sixth floors where attractions are given, rule 2 for preferential assignment to the machine number 3 elevator capable of non-stop running to a basement motor pool is registered. For down-calls 6D and 6DB at the sixth floor where an executive room is located and an attraction is given, rule 3 may be registered by which an elevator capable of waiting, for 5 to 15 seconds, at the first, third and sixth floors where the hall information device (for providing voice guide and multi-functional display) is installed can be selected, thereby enabling the passenger to fully appreciate the contents of the guide and improving efficiency of the whole system.

The conditional table iT12 shown in FIG. 9B records conditions for individual rules. In addition to the general condition of designating day and time, there is involved the condition for elevator including loading, waiting time, waiting passenger number, machine number designation and traffic. These items of the condition are typically handled in AND fashion and in order to handle these items in OR fashion, the rule added with sub-command or another rule may be registered. Data representative of respective items is described in terms of a decision condition formula. For example, the condition that load on cage is 30% or less is described as $$\text{WEIGHT} = <\text{SEKISAI} \times 0.3 \qquad (1)$$

where

WEIGHT: loading

SEKISAI (*K*): rated load on machine number *K* elevator.

The execution rule table iT13 shown in FIG. 9C records rules to be executed when individual conditional rules are valid. Described in this table are evaluation formulas and call assigned machine numbers. For example, an evaluation formula purporting that an elevator capable of first arrival is selected from elevators loaded 30% or less is described as $$\left.\begin{array}{l}\text{IF WEIGHT }(K) = <\text{SEKISAI }(K) \times 0.3\\ \text{THEN VALUE }(K) = \text{WAITT}\\ \text{ELSE VALUE }(K) = \text{MAX}\end{array}\right\} \qquad (2)$$

$$\text{ASIGN} = K \text{ FOR MIN [VALUE }(K)] \qquad (3)$$

where

WAITT: evaluation value (obtained in step F32)

VALUE (*K*): array of evaluation value

*K*: variable corresponding to machine number

ASIGN: call assigned machine number

MAX: maximum value.

In rule 1 in FIG. 9C, the above formula is further improved to attain a trade-off between the waiting time and the jam condition in cage. Actually, the above formula data is converted and recorded on the individual tables in terms of binary data which is executable by microcomputers. No condition is registered or recorded on blanks without an "0" mark.

Similarly, the guide display rule table consists of three parts as shown in FIGS. 10A, 10B and 10C.

The registration rule table iT21 shown in FIG. 10A indicates whether rules to be applied to individual floors in accordance with directions of elevator movement are defined, and it resembles the table iT11 structurally.

The conditional table iT22 shown in FIG. 10B structurally resembles the table iT12.

The execution rule table iT23 shown in FIG. 10C can select one of various display forms prepared in advance. Display forms corresponding to blanks with "0" mark can be selected. Pursuant to rule 3, general information display can be obtained and in this case message data is recorded on the table.

By storing registration numbers used to command execution of display of guide statement and picture registered precedently in the multi-functional display device, flexibility can be improved without increasing the amount of online transmission data.

Also registered in the table iT23 is the fundamental guide specification pursuant to rule 4 by which constant management of specifications can be ensured.

Rule 1 in FIG. 10C pertains to the time to attend office (8:00 to 9:00 A.M.) and according to this rule, the multi-functional display device installed on the first floor is operable to indicate the sequence of arrival of elevator in language "start first", "start next" or "wait" or in numerical expression "No. 1" only when the traffic during the office attending time is 20 or more passengers who engage in an up-call 1U at the first floor and is 10 passengers/5 cages or more throughout the whole floors.

But according to the fourth item of condition in conditional table iT22, the display is carried out only for elevators for which the waiting time is less than 30 seconds.

Rule 2 in FIG. 10C is carried out for an elevator which is assigned with an up hall call or an elevator which is determined to be stopped in response to a cage call, so as to display the cage position of the stopping elevator and a floor at which the stopping elevator is scheduled to stop.

Occasionally, some customers prefer the display of a waiting time to the display of a scheduled stop floor or desire an animating service guide by which all of three kinds of data and the degree of jam in the cage are displayed.

The table iT23 may preferably be designed for modification in preparation for such an event.

For convenience of expansion, spare blanks are provided for the rule number and the condition item.

Figure 11:
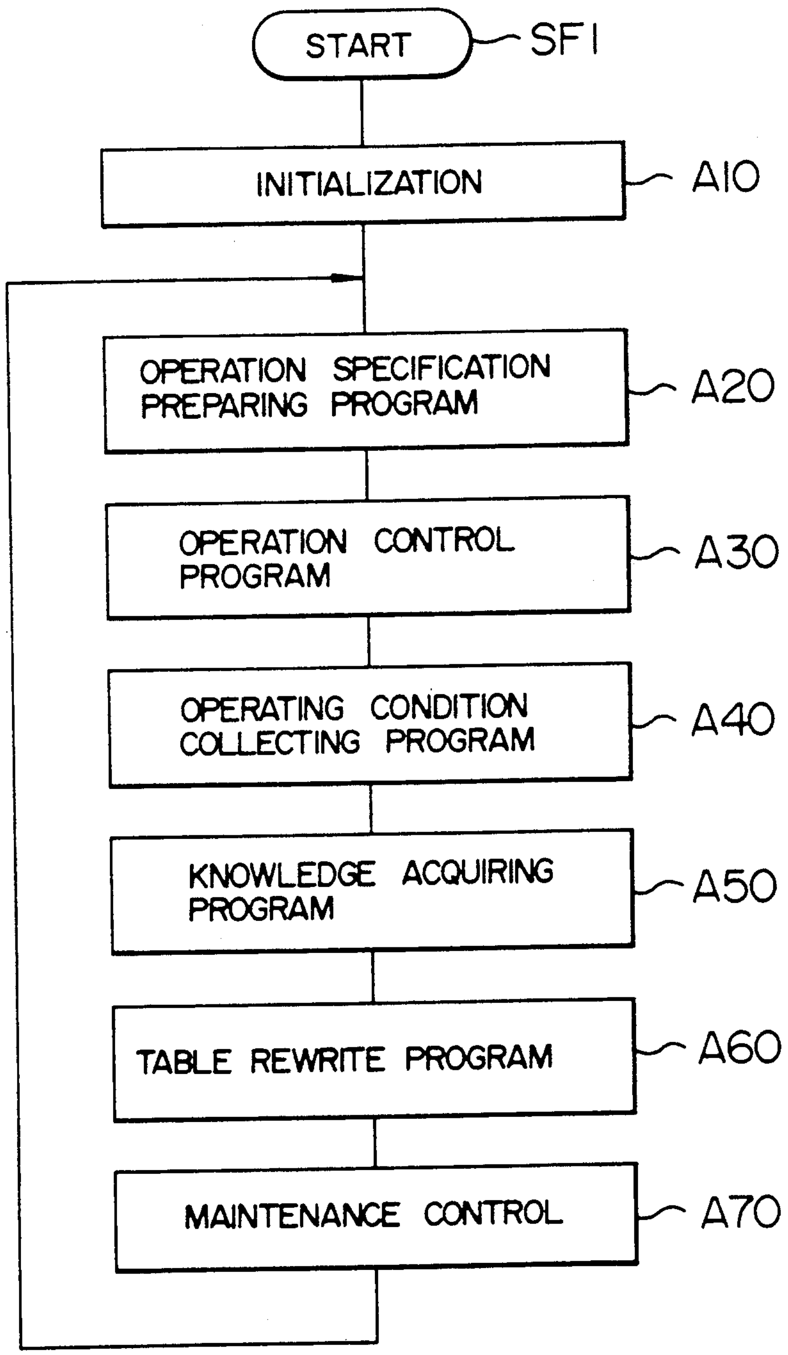
FIGS. 11, 12 and 13 are flow charts for execution of processings in a group management control program, an operation control program and a communication program.

FIG. 11 shows a schematic flow chart of processings in the group management control program.

After the power supply is turned on, initialization is started by resetting in step A10.

In this step, various tables are cleared and set to initial values and various input/output devices and communication devices are initialized.

Subsequently, steps A20 to A60 are executed repetitively until the power supply becomes down.

Most of the operation specification preparing program SF14 are executed in step A20. Subsequently, processings in operation program SF10 which do not require any response are executed in step A30. Thereafter, the operating condition collecting program SF13 is executed in step A40. Then, the knowledge acquiring program SF17 is executed in step A50 and the table rewrite program SF15 is executed in step A60. Finally, a maintenance/adjustment control program SF18 is executed in step A70. Generally, the above steps A20 to A60 are divided into a plurality of tasks and individual programs are started as desired at requisite periods to thereby perform highly efficient control. Task control is not referred to herein for simplicity of explanation.

FIG. 12 is a flow chart showing detailed processings in the operation control program SF10 as executed in step A30 in FIG. 11.

In step E20, all hall calls at all floors are inputted and set in the hall call table T12. In step E30, communication data from the machine number elevator control units is stored in the elevator control data table T11.

In step E40, the call assignment processing is executed and in step E50, the guide informing processing is executed.

In steps E60 to E80, the door open/close speed mode and reassignment control are executed.

Figure 13:
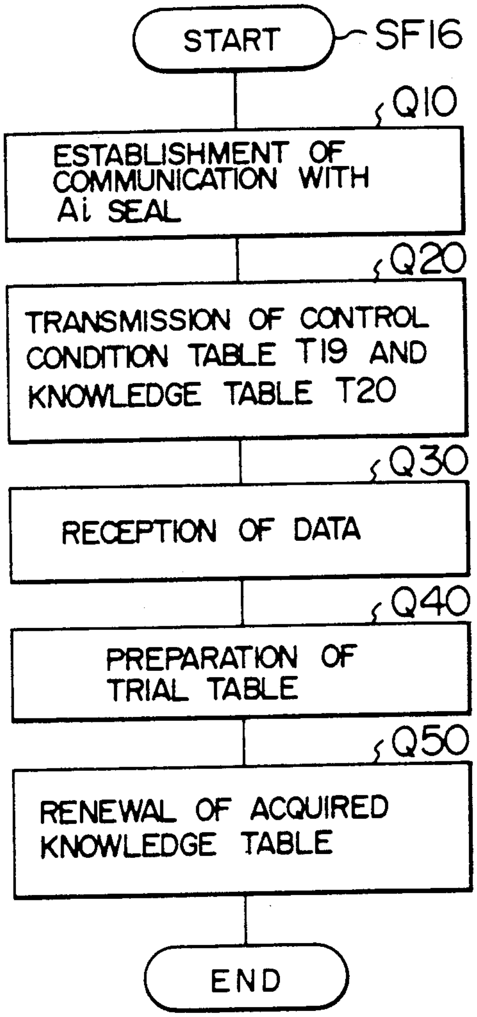

FIG. 13 is a schematic flow chart of the communication program.

The communication program is started by an interruption from the AI tool and processings in this program are executed in so-called background fashion by using idle time of the group management control program SF1. First, in step Q10, communication with the AI tool is set up. In steps Q20 to Q30, data representative of control condition stored in the recording table T12 and data representative of the current contents of the operation control form decision table iT15 are transmitted in response to a request of the AI tool and control rules are received which in turn are stored in the rule table T14. To prevent collapse of stored data in an event of power failure, the rule table T14 is backed up by means of a battery or prepared on an $E^2$PROM which is electrically writable and erasable.

In step Q40, the trial operation control table T14 is prepared and processings in the acquired knowledge table T20 are executed in step Q50.

FIG. 14 is a flow chart showing detailed processings in the call assignment process as executed in step E40 in FIG. 12.

Up/down operations throughout all floors are sequentially executed through steps F10, F20, F70 and F80.

In step F30, it is decided in one mode whether a newly originated hall call is present. In another mode, the presence or absence of a registration of a call may simply be decided. A call assignment control command in accordance with the call assignment method and operation control specification table T13 (e) selects one of the former and latter modes.

In step F32, evaluation value calculation is carried out in response to a fundamental call assignment method command (not shown) forming part of the call assignment control command T13 (67) partly constituting the operation control specification table T13.

In step F35, m is set to 3 when the number of rules is 3 as shown in FIGS. 9A to 9C, indicating that all of the three rules are to be processed.

In step F40, it is decided whether the assignment rule for a floor in question is registered. Thus, in this step, "0" marks assigned to blanks corresponding to the floor in question in the registration rule table iT11 shown in FIG. 9A are retrieved.

If no rule designated by "0" mark is found, the procedure proceeds to step F65. If a rule designated by "0" mark is found, the procedure proceeds to step F50 where conditional formulas in rule numbers described in the conditional table iT12 and about to be practiced are sequentially calculated and the condition is decided as to whether to be valid.

If valid, a call assignment is carried out pursuant to evaluation formulas described in the execution rule table iT13. The execution table contains, in addition to rules described in terms of evaluation formula, a rule such as rule 2 which directly designates a call assigned machine number elevator and assignment pursuant to rule 2 is executed without going through evaluation calculation.

Figure 15:
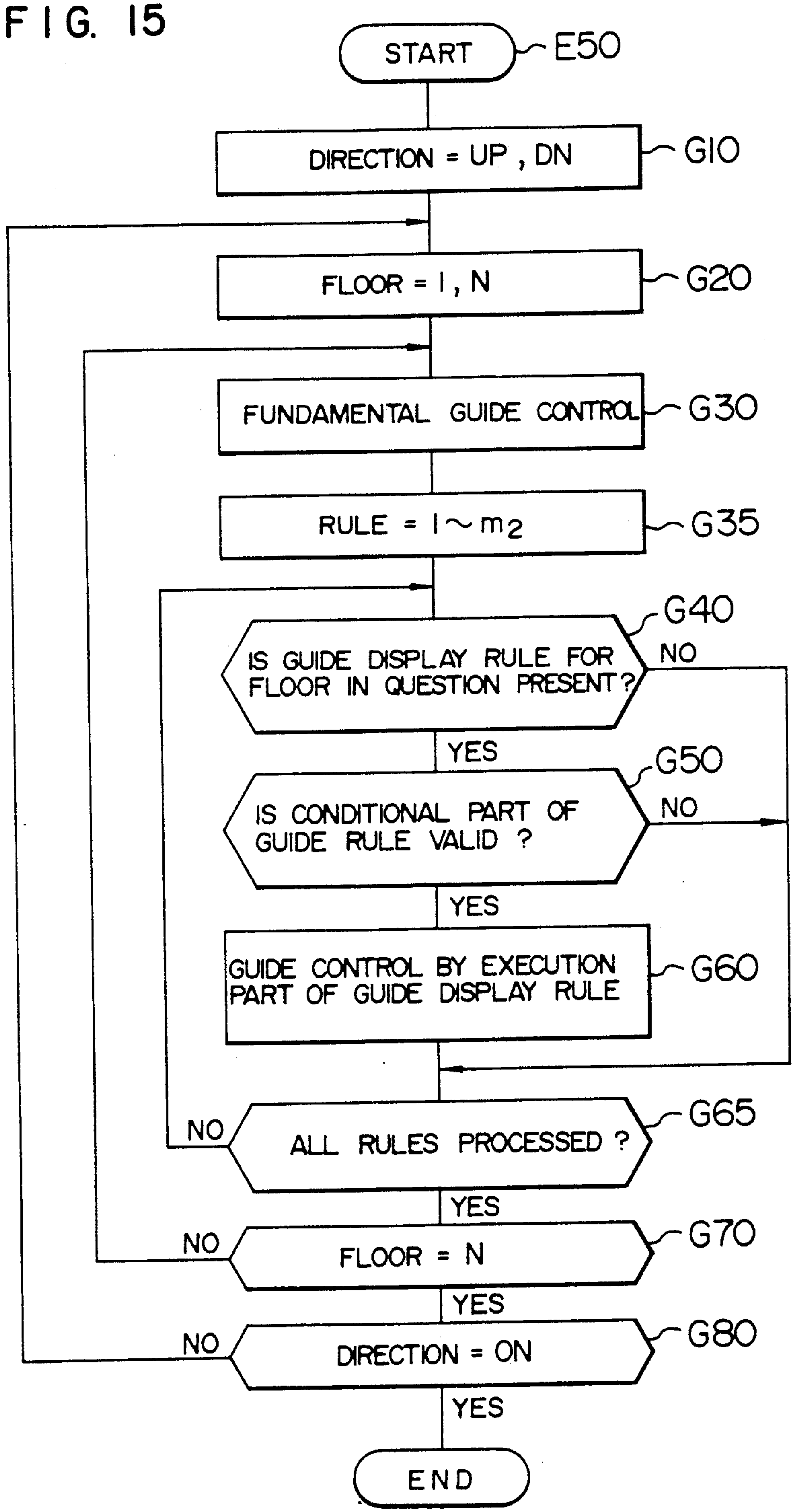
FIG. 15 is a flow chart for execution of processings in a guide informing process as executed in step E50 in FIG. 12.

FIG. 15 is a flow chart showing detailed processings in the guide informing process as executed in step E50 in FIG. 12.

Up/down operations throughout all floors are sequentially executed through steps G10, G20, G70 and G80.

In step G30, fundamental guide control pursuant to rule 4 in the table iT23 is executed.

In step G35, $m_2$ is set to 3 when the number of rules is 3 as shown in FIGS. 10A to 10C, indicating that all of the three rules are to be processed.

In step G40, it is decided whether the guide control rule for a floor in question is registered.

Thus, in this step, "0" marks assigned to blanks corresponding to the floor in question in the registration rule table iT21 shown in FIG. 10A are retrieved.

If no rule designated by an "0" mark is found, the procedure proceeds to step G65.

If a rule designated by an "0" mark is found, the procedure proceeds to step G50 where conditional formulas in rule numbers described in the conditional table iT22 and about to be practiced are sequentially calculated and the condition is decided as to whether to be valid.

If valid, guide control is carried out pursuant to display forms described in the execution rule table iT23. The execution table contains, in addition to display form designation method, direct a designation of display message by which message data is delivered directly to the display device.

With the above construction, of guide control processings governed by the floor dependent presence or absence of the informing means such as panel type multi-functional display device or voice guide device at the hall and the floor dependent contract of contents of guide information, only necessary processings can be executed to increase processing speed to advantage.

As described above, in accordance with the present program, it is possible to attend a variety of specifications by merely changing the simple subordinate subroutines and data tables without changing the fundamental execution program. Accordingly, the trial function according to the invention can drastically improve flexibility of the system.

FIG. 16 is a schematic flow chart showing processings in the AI tool 2. The AI tool serving as work station first carries out ordinary start-up operation and then activates the elevator specification change service program.

In step H10, the AI tool interrupts the elevator controller to set up communications and in step H20, the elevator control state is displayed. In this step, the contents of the control state recording table transmitted from the elevator controller is edited into tables and graphs which are displayed on the CRT. In steps H30 to H60, specifications of the request of the customer are inputted conversationally in such a manner that a guidance display for inputting is answered by the customer. This manner of inputting is employed in general expert systems and will not be detailed herein. Briefly, when the customer's specifications are inputted, the inputted specification are converted into the rule tables described with reference to FIGS. 9A to 9C. Then, rules are checked for their rationality and if unconvertible part is found, the procedure proceeds to step H60 and the guidance is again displayed.

When the conversion is completed through repetition of the above operation, the procedure proceeds to step H70 where deduction is executed as to what change occurs in elevator control condition (for example, waiting time) in response to the inputted change of specifications and deduction results are displayed.

In addition, another change of specifications, permissible in view of the deduction results, is advised and displayed. Subsequently, in step H80, it is decided whether the inputted change of specifications is to be executed ultimately and if the answer is yes (execution), the procedure proceeds to step H90 where the rule tables are transmitted to the group management control unit. If the answer is no (pause), the procedure returns to step H30 and specifications are inputted again.

The change of guide control is processed likewise to prepare the rule tables described in connection with FIGS. 10A to 10C.

In the foregoing embodiment, the AI tool is described as being operated by the customer but obviously it may be operated by the maintenance company through telephone line so as to be connected to the elevator controller. Further, the range of the change of specifications by the customer may be limited using a password in order not to acknowledge input data which might cause an extreme degradation in performance.

The contents subject to the change by the customer may be recorded in the host computer 8 and upon maintenance service, it can be confirmed and recovered.

Further, in the system of this invention, the maintenance terminal 7, operation command terminal 9 and building caretaker unit 11 may be used in combination to substitute for the AI tool.

In an alternative, various requests of the customer may be converted into specific rules consisting of conditional and execution parts and stored in an IC card which substitutes for, for example, the trial operation control table T14, and the customer can use the IC card at any time by inserting it into the system.

The program related to the guide informing unit at the hall in the foregoing embodiment may easily be modified so as to be adapted for control of in-cage informing units.

Further, the invention may obviously be applied to, in addition to the call assignment rule and guide display rule described in the foregoing embodiment, other rules such as operation management rule prescribing dispersive floors, start floor, peak service divisional operation or skip operation and door control rule for a single elevator.

According to the invention, the provision of means for storing operation control specifications and means responsive to the newly inputted contents to set trial operation information and store the information can advantageously permit trial of the operation control specifications, thus enabling the user to participate in decision making in selection.

We claim:

1. A customer participatory elevator control system for use in an elevator system having a plurality of elevators serving a plurality of floors, means for storing predetermined specification information necessary to operate said elevators, and means for controlling the operation of said elevators on the basis of said predetermined specification information, said control system comprising:

means for setting and storing information necessary to operate said elevators on a trial basis;

means for rewriting the contents of said predetermined specification information storing means into trial operation information;

means for controlling a trial operation of said elevators on the basis of the trial operation information; and means for analyzing results of the trial operation and restoring the original contents of said predetermined specification information storing means in response to said analyzed results.

2. A customer participatory elevator control system according to claim 1, wherein the restoring of the original contents of said predetermined specification information storing means is performed automatically in response to said analyzed results.

3. A customer participatory elevator control system for use in an elevator system having a plurality of elevators, said control system comprising:

an elevator controller including a group management control unit;

an artificial intelligence tool connected to said group management control unit;

a computer connected to said artificial intelligence tool; and a maintenance terminal;

said group management control unit comprising:

a program for controlling the operation of the elevators;

an operation control form decision table including a fundamental control specification table;

a table rewrite program connected to said fundamental control specification table and responsive to a command from said maintenance terminal to prepare a trial operation program;

a trial operation control table, connected to said table rewrite program, for executing said trial operation program; and an operation specification preparing program for preparing elevator operation specifications on the basis of data of at least said operation control form decision table; and said control system further comprising:

means for analyzing results of a trial operation of the elevators performed in accordance with said trial operation program, and for restoring the trial operation program to an original program for controlling the operation of the elevators in response to said analyzed results.

4. A customer participatory elevator control system according to claim 3 wherein said operation control form decision table comprises a management table, said fundamental control specification table for determining machine number dependent service floors, a user's knowledge table for storing knowledge of a user, and an operation mode command table for designating a type of operation program.

5. A customer participatory elevator control system according to claim 3 wherein said group management control unit further comprises a communication program to enable said artificial intelligence tool to prepare said trial operation control table and read part of said operation control form decision table through the medium of said communication program.

6. A customer participatory elevator control system according to claim 3, wherein the restoring of the trial operation program to an original program for controlling the operation of the elevators is performed automatically in response to said analyzed results.

7. A customer participatory elevator control system for use in an elevator system having a plurality of elevators serving a plurality of floors, means for storing predetermined specification information necessary to operate said elevators, and means for controlling the operation of said elevators on the basis of said predetermined specification information, said control system comprising:

means for setting and storing information necessary to operate said elevators on a trial basis;

means for rewriting the contents of said predetermined specification information storing means into trial operation information;

means for controlling a trial operation of said elevators on the basis of the trial operation information; and means for analyzing results of the trial operation.

* * * * *